United States Patent [19]

Anderson et al.

[11] Patent Number: 5,340,783

[45] Date of Patent: * Aug. 23, 1994

[54] METHOD OF PRODUCING SELF-SUPPORTING ALUMINUM TITANATE COMPOSITES AND PRODUCTS RELATING THERETO

[75] Inventors: Edward N. Anderson, Centerville; Thomas A. Johnson, Newark, both of Del.

[73] Assignee: Lanxide Technology Company, LP, Newark, Del.

[*] Notice: The portion of the term of this patent subsequent to Aug. 18, 2009 has been disclaimed.

[21] Appl. No.: 931,170

[22] Filed: Aug. 17, 1992

Related U.S. Application Data

[63] Continuation of Ser. No. 697,741, May 6, 1991, Pat. No. 5,139,979, which is a continuation of Ser. No. 320,114, Mar. 7, 1989, abandoned, which is a continuation-in-part of Ser. No. 303,832, Jan. 30, 1989, abandoned.

[51] Int. Cl.$^5$ .................. C04B 35/46; C04B 35/10
[52] U.S. Cl. .................. 501/134; 501/127; 501/135; 501/136; 501/153
[58] Field of Search .............. 501/127, 134, 135, 136, 501/153

[56] References Cited

U.S. PATENT DOCUMENTS

| | | | |
|---|---|---|---|
| 2,776,896 | 1/1957 | Harman et al. | 264/56 |
| 3,421,863 | 1/1969 | Bawa et al. | 501/128 |
| 3,473,987 | 10/1969 | Sowards | 501/119 |
| 3,549,400 | 12/1970 | Lachman | 501/114 |
| 3,568,723 | 3/1971 | Sowards | 60/272 |
| 4,118,240 | 10/1978 | Takabatake | 501/127 |
| 4,277,539 | 7/1981 | Keller et al. | 428/450 |
| 4,327,188 | 4/1982 | Endo et al. | 501/134 |
| 4,483,944 | 11/1984 | Day et al. | 501/128 |
| 4,524,732 | 6/1985 | Dworak et al. | 123/193 H |
| 4,526,824 | 7/1985 | Dworak et al. | 428/34.5 |
| 4,758,542 | 7/1988 | Parker | 501/134 |
| 4,855,265 | 8/1989 | Day et al. | 501/128 |
| 5,139,979 | 8/1992 | Anderson et al. | 501/134 |

FOREIGN PATENT DOCUMENTS 0285312 10/1988 European Pat. Off. .

Primary Examiner—Karl Group
Attorney, Agent, or Firm—Mark G. Mortenson; Jeffrey R. Ramberg

[57] ABSTRACT

The present invention relates, generally, to a self-supporting porous ceramic composite body and to methods for producing such articles to net or near net shape, which bodies exhibit superior thermal and mechanical properties. The invention also relates to the manufacture of ceramic-metal composite bodies which have ceramic articles incorporated therein.

23 Claims, 4 Drawing Sheets

METHOD OF PRODUCING SELF-SUPPORTING ALUMINUM TITANATE COMPOSITES AND PRODUCTS RELATING THERETO

This is a continuation of copending application Ser. No. 07/697,741 filed on May 6, 1991 which issued on Aug. 18, 1992, as U.S. Pat. No. 5,139,979, which is a continuation of U.S. patent application Ser. No. 07/320,114, filed on Mar. 7, 1989, now abandoned, which is a continuation-in-part of U.S. patent application Ser. No. 07/303,832, filed Jan. 30, 1989, now abandoned.

FIELD OF INVENTION

The present invention relates, generally, to a self-supporting porous ceramic composite body and to methods for producing such articles to net or near net shape, which bodies exhibit superior thermal and mechanical properties. The invention also relates to the manufacture of ceramic-metal composite bodies which have ceramic articles incorporated therein.

BACKGROUND OF THE INVENTION

Historically, there have been numerous attempts to obtain a relatively inexpensive ceramic material which exhibits desirable properties such as resistance to thermal shock, ability to function as a thermal insulating material, high mechanical strength, low coefficient of thermal expansion, the ability to form the ceramic material to a net or near net shape, the capability of achieving little or no shrinkage upon firing (e.g., sintering) and the ability to produce economically such a body. It is a difficult engineering task to achieve a body containing a)i of the aforementioned desirable properties. To date, the challenge has not been adequately met.

A first practical application for,a ceramic body which possess the above-discussed properties is the use of the body as a thermally insulating tube or shape within a metal body. For example, in applications where it is necessary for hot gasses to flow through a metal body, a ceramic tube or channel may be used as a liner which is encased within the metal body, thereby defining a channel for the flow of hot gasses therethrough. Such applications require that the ceramic article possess adequate heat insulating properties.

A practical and inexpensive method for forming a composite body having an integral ceramic surrounded by a mass of metal entails solidifying a cast molten metal around a ceramic article. However, the ceramic body often cracks due to thermal shock which occurs during casting. Further, when the cast metal solidifies and cools around the ceramic article, contraction of the surrounding metal can occur such that high compressive stresses may result in the ceramic article which also may result in failure of the ceramic. Particularly, the thermal expansion coefficients of the ceramic and the metal typically differ from each other such that the stresses which are exerted upon the ceramic article can result in crack initiation and/or catastrophic failure of the ceramic. Such crack initiation and/or failure has been especially pronounced in low strength, hollow, ceramic articles. Moreover, crack initiation and/or failure in the casting metal has also been a problem in certain applications. For example, when the metal surrounding the ceramic is thin, the greater magnitude of contraction of the metal during cooling can result in tensile stresses in the metal which can lead to a yielding or failure thereof.

One technique known in the art for ameliorating the undesirable stresses involved requires the use of ceramic articles having relatively thick, porous coatings or layers of material. However, ceramic-metal composite bodies which employ thick coatings on a ceramic article may be prone to physical damage due to the presence of a relatively thick and weak layer between the metal and the ceramic. Moreover, such coatings can be difficult, and in certain cases expensive, to apply. Still further, in some applications the presence of a coating may be completely unacceptable. Moreover, a requirement for specific mechanical properties in a ceramic may reduce the capacity to deliver desirable thermal properties.

A specific application which involves placing a ceramic article within a mass of metal is an exhaust port for an engine (e.g., an internal combustion engine). Specifically, a ceramic article which can be surrounded by molten metal in a casting operation, (e.g., surrounded by molten metals such as aluminum and iron) without resulting in substantial injury to the ceramic or the metal which has been cast and cooled, would be advantageous in production of articles such as an automotive exhaust port liner.

A need therefore exists to provide an inexpensive, reliable material composition for ensuring that ceramic articles will survive the stresses associated with metal casting operations so as to provide structurally sound ceramic-metal composite bodies. In particular, a need exists for ensuring that molten metal may be cast around a ceramic article without degrading the mechanical properties of the ceramic and without degrading the mechanical properties of the ceramic-metal composite or assembly. In addition, a need exists to ensure that when molten metal is cast around a ceramic article and the thickness of the cooling metal is thin relative to the thickness of the ceramic article, and/or the tensile strength of the metal is low compared to the compressive strength of the ceramic, that the metal will not crack due to the development of tensile stresses therein.

Another practical application for a ceramic composite material which exhibits the above-discussed mechanical properties is the use of the material in a turbine engine shroud. The shroud is the nonrotating cylindrical assembly which surrounds the tips of the turbine blades. The environment that a turbine engine shroud is subjected to is one which requires a body to be thermally insulating, have a high thermal shock resistance, have a low coefficient of thermal expansion, etc. Moreover, in some instances the turbine blades of a turbine engine may expand due to thermal energy and contact (e.g., rub against) the turbine engine shroud. For example, during initial operation of a turbine engine, the turbine blades, in some cases, are designed so that they will contact the shroud. This intentional contacting is effected so that the shroud will be abraded or machined by the tips of turbine blades such that the clearance between the blade tips and the shroud is minimized. By minimizing such clearance, the undesirable bypass of working fluid is minimized. When such contact occurs, the turbine blades of the engine could be damaged and catastrophically fail (i.e., break). If the turbine blades were damaged, it is possible that performance of the engine could be affected adversely, or it is possible that a more catastrophic failure of the turbine blades could result (e.g., the engine could be destroyed). Thus, engineers have been faced with the problem of contact of turbine blades with the engine shroud, such contact leading to potential failure of the turbine engine if the shroud is not readily machinable or abradable by the blade tips. Accordingly, a need exists to provide an improved material which exhibits all the above-discussed properties. In other words, the material should be capable of surviving in a turbine engine; and when rotating blades of the turbine contact the engine shroud, the engine shroud is machined by the blades and neither of the engine shroud or the turbine blades are adversely affected by such machining.

DISCUSSION OF RELATED PATENTS APPLICATIONS

The subject matter of this application is related to that of other copending and commonly owned patent applications and patents. Particularly, these other patent applications and patents (hereinafter sometimes referred to as "Commonly Owned Ceramic Matrix Patents and Applications"), describe novel methods for making ceramic and ceramic composite materials.

A novel method of making a ceramic composite is disclosed in Commonly Owned U.S. patent application Ser. No. 07/699,403, filed on May 13, 1991, now U.S. Pat. No. 5,139,977, which issued on Aug. 18, 1992, as a continuation of U.S. patent application Ser. No. 07/414,183, filed on Sep. 28, 1989, now U.S. Pat. No. 5,015,610, which issued on May 14, 1991, which was a divisional of U.S. patent application Ser. No. 908,119, filed on Sep. 16, 1986, now U.S. Pat. No. 4,956,137, which issued on Sep. 11, 1990, all in the names of Ratnesh K. Dwivedi et al, and entitled "Porous Ceramic Composite with Dense Surface" (a foreign counterpart to this application was published in the EPO on Mar. 23, 1988, as application Ser. No. 0,261,050). According to the invention of Dwivedi et al, metal particles can be admixed with a filler material and this admixture is shaped into a preform. The preform is heated in an oxidizing atmosphere to result in the formation of oxidation reaction product which grows through and embeds the filler material. The process of embedding the filler is continued until the oxidation reaction product has grown to the boundaries of the preform, at which point oxidation reaction product grows out from at least a portion of the preform thus forming a dense surface layer of oxidation reaction product on at least a portion of one surface of the preform.

A method for encasing a ceramic article in a cast metal body is disclosed in U.S. patent application Ser. No. 116,412, filed Nov. 3, 1987, which issued on Jul. 18, 1989, as U.S. Pat. No. 4,849,266 in the names of Ratnesh K. Dwivedi, et al. and entitled "Compliant Layer". According to the method of this Dwivedi, et al. application, a method for prevention of rupture (i.e., catastrophic failure) of a ceramic article, particularly, a low strength ceramic article is disclosed. Specifically, a compliant layer is located on at least a portion of a surface of a ceramic body prior to molten metal contacting the ceramic body and/or the compliant layer. The compliant layer ameliorates the thermal and/or compressive stresses which occur during the pouring, solidification and cooling of a molten metal which has been cast around the ceramic article.

Moreover, several other Commonly Owned Ceramic Matrix Patents and Applications describe novel methods for reliably producing ceramic materials and ceramic composite materials. The method is disclosed generically in Commonly Owned U.S. Pat. No. 4,713,360, which was issued on Dec. 15, 1987, in the names of Marc S. Newkirk et al and entitled "Novel Ceramic Materials and Methods for Making Same" (a foreign counterpart to this patent was published in the EPO on Sep. 25, 1985, as application Ser. No. 0,155,831). This Patent discloses a method of producing self-supporting ceramic bodies grown as the oxidation reaction product of a molten parent precursor metal which is reacted with a vapor-phase oxidant to form an oxidation reaction product. Molten metal migrates through the formed oxidation reaction product to react with the oxidant, thereby continuously developing a ceramic polycrystalline body which can, if desired, include an interconnected metallic component. The process may be enhanced or in certain cases enabled by the use of one or more dopants alloyed with the parent metal. For example, in the case of oxidizing aluminum in air, it is desirable to alloy magnesium and silicon with the aluminum to produce alpha-alumina ceramic structures.

The method of U.S. Pat. No. 4,713,360 was improved upon by the application of dopant materials to the surface of the parent metal, as described in Commonly Owned and Copending U.S. patent application Ser. No. 220,935, filed Jun. 23, 1988, now U.S. Pat. No. 4,853,352, which is a continuation of application Ser. No. 822,999, filed Jan. 27, 1986, now abandoned which is a continuation-in-part of application Ser. No. 776,965, filed Sep. 17, 1985, now abandoned which is a continuation-in-part of application Ser. No. 747,788, filed Jun. 25, 1985 now abandoned, which is a continuation-in-part of Ser. No. 632,636, filed Jul. 20, 1984 now abandoned, all in the names of Marc S. Newkirk et al and entitled "Methods of making Self-Supporting Ceramic Materials" (a foreign counterpart to this Application was published in the EPO on Jan. 22, 1986, as application Ser. No. 0,169,067).

A similar oxidation phenomenon was utilized in producing ceramic composite bodies as described in Commonly Owned and U.S. patent application Ser. No. 819,397, which issued on Jul. 25, 1989, as U.S. Pat. No. 4,851,375, filed Jan. 17, 1986, which is a continuation-in-part of application Ser. No. 697,876, filed Feb. 4, 1985 now abandoned, both in the names of Marc S. Newkirk et al and entitled "Composite Ceramic Articles and Methods of Making Same" (a foreign counterpart to this Application was published in the EPO on Sep. 3, 1986 as application Ser. No. 0,193,292). These applications and patent disclose novel methods for producing a self-supporting ceramic composite body by growing an oxidation reaction product from a parent metal precursor into a permeable mass of filler, (e.g., a silicon carbide particulate filler or an alumina particulate filler) thereby infiltrating or embedding the filler with a ceramic matrix.

A method for producing ceramic composite bodies having a predetermined geometry or shape is disclosed in Commonly Owned U.S. patent application Ser. No. 07/338,471, filed on Apr. 14, 1989, now U.S. Pat. No. 5,017,526, which issued on May 21, 1991, entitled "Method of Making Shaped Ceramic Composite", which was a continuation of U.S. patent application Ser. No. 06/861,025, filed May 8, 1986, in the names of Marc S. Newkirk et al and entitled "Shaped Ceramic Composites and Methods of Making the Same" (a foreign counterpart to this Application was published in the EPO on Nov. 11, 1987 as application Ser. No. 0,245,192). In accordance with the method in this U.S.

Patent, the developing oxidation reaction product infiltrates a permeable self-supporting preform of filler material (e.g., an alumina or a silicon carbide preform material) in a direction towards a defined surface boundary to result in predetermined geometric or shaped composite bodies.

Each of the above-discussed Commonly Owned Ceramic Matrix Patents and Applications describes methods for the production of ceramic and/or ceramic matrix composite bodies and novel ceramic and ceramic matrix composite bodies which are produced therefrom. The entire disclosures of all the foregoing Commonly Owned Ceramic Matrix Patents and Applications are expressly incorporated herein by reference.

As discussed in these Commonly Owned Ceramic Matrix Patents and Applications, novel polycrystalline ceramic materials or polycrystalline ceramic composite materials are produced by the oxidation reaction between a parent metal and an oxidant (e.g., a solid liquid and/or a gas). In accordance with the generic process disclosed in these Commonly Owned Ceramic Matrix Patents and Applications, a parent metal (e.g., aluminum) is heated to an elevated temperature above its melting point but below the melting point of the oxidation reaction product to form a body of molten parent metal which reacts upon contact with an oxidant to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional fresh oxidation reaction product upon contact with the oxidant, at the surface of previously formed oxidation reaction product. As the process continues, additional metal is transported through this formation of polycrystalline oxidation reaction product thereby continually "growing" ceramic structure of interconnected crystallites. The resulting ceramic body may contain metallic constituents, such as non-oxidized constituents of the parent metal, and/or voids. Oxidation is used in its broad sense in all of the Commonly Owned Ceramic Matrix Patents and Applications and in this application, and refers to the loss or sharing of electrons by a metal to an oxidant which may be one or more elements and/or compounds. Accordingly, elements other than oxygen may serve as an oxidant.

In certain cases, the parent metal may require the presence of one or more dopants in order to influence favorably or to facilitate growth of the oxidation reaction product. Such dopants may at least partially alloy with the parent metal at some point during or prior to growth of the oxidation reaction product. For example, in the case of aluminum as the parent metal and air as the oxidant, dopants such as magnesium and silicon, to name but two of a larger class of dopant materials, can be alloyed with aluminum and the created growth alloy is utilized as the parent metal. The resulting oxidation reaction product of such a growth alloy comprises alumina, typically alpha-alumina.

Novel ceramic composite structures and methods of making the same are also disclosed and claimed in certain of the aforesaid Commonly Owned Ceramic Matrix Patents and applications which utilize the formation of an oxidation reaction product to embed a substantially inert filler material, thereby resulting in ceramic composite structures (note: in some cases it may be desirable to use a solid oxidant, e.g., a material which is at least partially reactive with the advancing oxidation reaction product and/or parent metal). Specifically, a parent metal is positioned adjacent to, or, if provided as a powdered parent metal, can be distributed at least partially within, a mass of permeable filler which can be shaped and treated to be self-supporting (e.g., formed into a preform), and is heated to form a body of molten parent metal which is reacted with an oxidant, as described above, to form an oxidation reaction product. As the oxidation reaction product grows and infiltrates the adjacent filler material, molten parent metal is drawn through previously formed oxidation reaction product within the mass of filler and reacts with the oxidant to form additional fresh oxidation reaction product at the surface of the previously formed oxidation reaction product, as described above. The resulting growth of oxidation reaction product infiltrates or embeds the filler and results in the formation of a ceramic composite structure comprising a polycrystalline ceramic matrix embedding the filler.

SUMMARY OF THE INVENTION

The present invention relates to a novel composition for producing a ceramic body and the novel ceramic body produced thereby. The composition utilized to form the ceramic body comprises a powdered mixture of aluminum titanate (or precursor materials which will form aluminum titanate), parent metal (e.g., aluminum), and stabilization aids. The stabilization aids are typically present in an amount of from about 5 to about 20% by weight, and include materials such as $SiO_2$, $MgO$, chrome ore, iron oxide ($Fe_2O_3$), ilmenite ($FeTiO_3$), etc., which are added to the aluminum titanate (or precursors to aluminum titanate) and parent metal (e.g., aluminum) mixture. The stabilizers may react with the aluminum titanate or the precursors thereto to form a complex oxide upon heating. Moreover, the stabilizers may assist in maintaining certain desirable properties of the resulting ceramic body (e.g., prevent the decomposition of $Al_2TiO_5$). Particularly, the stabilization aids may enhance the thermal stability of the aluminum titanate phase even after the ceramic body has been subjected to repeated heating and cooling cycles, for example, cycling between temperature and about 900°–1200° C. Preferably, the aluminum titanate phase which is present in the formed ceramic body is present in an amount of at least about 50% by weight, and most preferably, at least about 75% by weight.

The aluminum titanate which is present in the final ceramic body, may be present initially as aluminum titanate or it may be formed by a reaction between aluminum titanate precursor materials. For example, $Al_2O_3$, $TiO_2$, aluminum, and/or titanium metal powder when mixed and heated in an appropriate environment (e.g., an oxygen-containing atmosphere) may function as suitable precursors for forming the $Al_2TiO_5$ phase in the formed ceramic body. Accordingly, various mixtures of $Al_2TiO_5$, $Al_2O_3$, $TiO_2$, ilmenite, aluminum, and titanium metal powder etc., can be utilized to form the $Al_2TiO_5$ phase. These materials may not react fully and may be present as residual materials in the formed ceramic body (e.g., some $Al_2O_3$, $TiO_2$, aluminum and/or titanium metal may remain in the formed ceramic body).

The amount of parent metal (e.g., aluminum) which is supplied to the starting composition which is utilized to form a ceramic body according to the present invention, can be varied depending upon the particular properties which are desired in the produced ceramic body, For example, the parent metal (e.g., aluminum) may be provided as a powdered metal, and can be present in an amount of from about 5 weight percent to about 35 weight percent in order to provide an aluminum titanate body having desirable porosity. When a lower weight percentage of powdered parent metal (e.g., about 5 weight percent aluminum) is provided, a lesser amount of porosity can be present in the produced body (e.g., about 5 volume percent porosity). Whereas, when a greater weight percentage of powdered parent metal (e.g., about 20 weight percent aluminum) is provided to the initial starting composition, the amount of porosity which results in the formed ceramic body is increased (e.g., about 50 volume percent porosity). Accordingly, by controlling the amount of powdered parent metal (e.g., aluminum) provided (e.g., mixed into the initial mixture) the amount of porosity and the properties related thereto, for example, thermal conductivity, may be tailored (i.e., controlled) in the ceramic body.

Moreover, the composition and/or configuration (e.g., diameter and shape) of the powdered parent metal may also be important. Specifically, when aluminum is utilized as the parent metal, as discussed above in the related patent applications, in some cases it may be desirable to contact, at least at some point during the process, the powdered aluminum metal with at least one dopant. However, it may not be essential for such dopants to be combined with the aluminum, in that the porosity which is formed due to the reaction of the aluminum metal with an oxidant, may be sufficient to provide desirable results in the formed ceramic body, without the presence of any significant amount of dopants. Still further, the amount of parent metal provided can influence the amount of oxidation reaction product that is formed.

A mixture comprising an aluminum titanate material or precursors thereof, powdered parent metal (e.g., aluminum, when not present as a precursor to aluminum titanate) and at least one stabilization aid is formed into a desired shape, preferably having the components of the mixture substantially uniformly distributed throughout the desired shape. Typical forming fabrication procedures for forming the mixture into a desirable green body include dry pressing, slip casting, sediment casting, extrusion, injection molding, etc. The formation of a green body by slip casting has proven to be particularly advantageous. After the green ceramic body is formed, the green body may be dried, oxidized, and sintered to at least about 1400° C.–1700° C., preferably at about 1500° C.–1600° C., to provide a porous body comprising aluminum titanate.

The aluminum titanate body which is formed according to the present invention, which, for example, utilizes an appropriate amount of aluminum as the powdered parent metal, is characterized by a low coefficient of thermal expansion (e.g., $1.9 \times 10^{-6}$/°C.), a low thermal conductivity (e.g., 1.0 watts/mK), a relatively high compliance strain (e.g., $30 \times 10^{-4}$) and a desirable Young's Modulus (e.g., 20 GPa). Moreover, the aluminum titanate body has a high machinability, and a high resistance to thermal shock (e.g., molten iron can be cast around the aluminum titanate body). Further, the present invention may form a novel body comprising an aluminum titanate matrix reinforced with alumina grains, said body containing substantially uniformly sized pores interspersed therein. Moreover, the body may exhibit a certain amount of microcracking in at least portions thereof due at least in part, to the anisotropic nature of the aluminum titanate phase. Thus, an aluminum titanate body produced according to the invention is capable of being contacted (e.g., immersed in or surrounded) by a mass of molten metal, which can be cooled thereabout, without failure of the ceramic or metal due to thermal shock or mechanical stresses.

Thus, an aluminum titanate body formed according to the present invention may be suited ideally for use as a combustion chamber liner, an exhaust port liner, an exhaust manifold, a piston crown insert and/or a turbocharger housing, etc. All of these are examples of heat engine components which require a low thermal conductivity to prevent damage to less heat-resistant components and/or prevent heat loss; reasonably high strengths and/or low elastic moduli to tolerate such stresses as combustion pressures, or stresses imposed due to casting such components such as inserts into metal; good erosion and corrosion resistance to an environment comprising unburned combustion products such as carbon (as in the case of an exhaust port liner); and lightweight.

Moreover, the aluminum titanate body of the present invention can also be utilized as an engine shroud for a turbine engine. Specifically, an aluminum titanate body produced according to the present invention is particularly advantageous because of its thermal insulating properties (e.g., low thermal conductivity), thermal shock resistance, and its capability of being machined by the turbine blades. When a turbine engine is initially operated, the turbine blades tend to expand, due to thermal energy, at a rate which is greater than the rate of thermal expansion of the surrounding shroud. Accordingly, the turbine blades may come into contact with the shroud. Such contact is more likely to occur when an engine is newly assembled or refurbished. The aluminum titanate body of the present invention (e.g., when utilized as a shroud) can be abraded or machined by the turbine blades without the shroud chipping or breaking in an undesirable manner, and also ameliorating any undesirable effects of the turbine blades contacting the shroud.

Further, features and advantages of the present invention will be apparent from the detailed description herein below set forth.

Definitions

"Aluminum titanate mixture", as used herein, means those materials which, when combined and heated to an elevated temperature in the presence of an appropriate environment (e.g., an oxygen-containing atmosphere), will form a body comprising at least 50 percent by weight aluminum titanate.

"Parent metal", as used herein, means and includes essentially pure metal (e.g., a relatively pure, commercially available unalloyed aluminum:) or other grades of metal and metal alloys such as the commercially available metals having impurities and/or alloying constituents such as iron, silicon, copper, magnesium, manganese, chromium, zinc, etc., therein. A parent metal alloy for purposes of this definition is an alloy or an intermetallic compound in which the parent metal (e.g., aluminum) is the major constituent. Typically, examples of parent metals comprise aluminum, titanium, zirconium, etc.

"Oxidation reaction product", as used herein, means one or more metals in any oxidized state wherein a metal has given up electrons to or shared electrons with another element, compound, or combination thereof. Accordingly, an "oxidation reaction product" under this definition includes the product of reaction of one or more metals with an oxidant such as those described in this application. The oxidant utilized to form an oxidation reaction product means one or more suitable electron acceptors or electron sharers and may be a solid, a liquid or a gas (vapor) or some combination of these (e.g., a solid and a gas) at the process conditions. Accordingly, an "oxidation reaction product" under this definition includes the product of the reaction of one or more metals with an oxidant such as oxygen, nitrogen, a halogen, sulfur, phosphorus, arsenic, carbon, boron, selenium, tellurium, and compounds and combinations thereof including, for example, reducible metal compounds, methane, ethane, propane, acetylene, ethylene, propylene and mixtures such as air, $H_2/H_2O$ and $CO/CO_2$. The resulting "oxidation reaction product" can be used as the ceramic in a ceramic-metal composite body.

DESCRIPTION OF THE PREFERRED EMBODIMENTS

Figure 1:
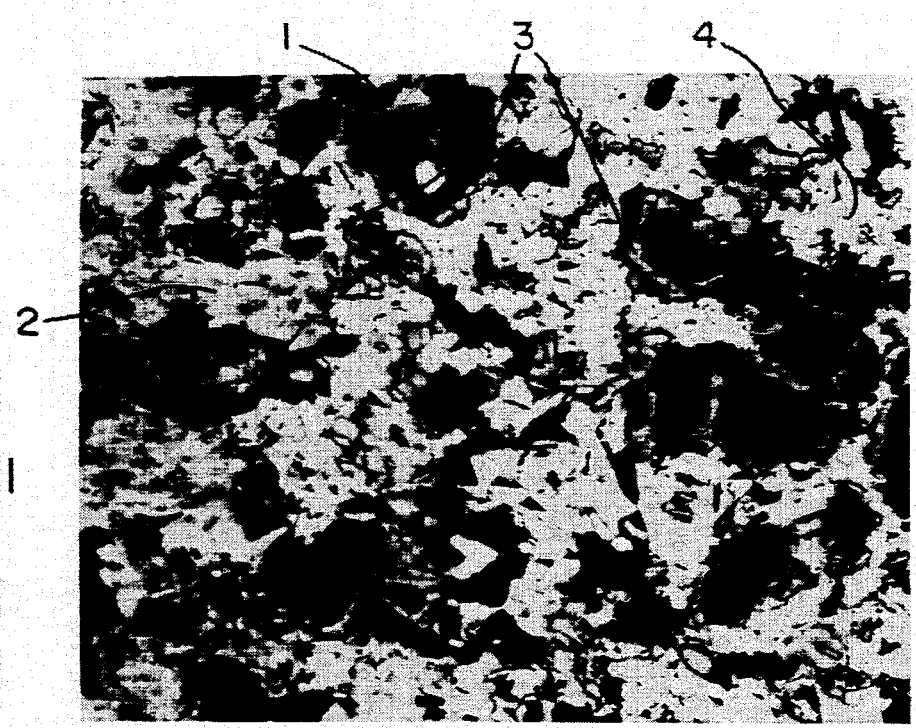
FIG. 1 is an optical photomicrograph at 200 X of a section of a body produced according to Example 2.

The present invention is based on the discovery that a desirable porous ceramic body can be formed by mixing together a mixture comprised of aluminum titanate (or materials which when heated will form aluminum titanate), a parent metal (e.g., aluminum), when not present as a precursor to aluminum titanate, and at least one stabilization aid, which mixture, when heated to an oxidizing and/or sintering temperature, in the presence of an appropriate environment (e.g., an atmosphere containing an oxidant) will result in a ceramic body which possess a low coefficient of thermal expansion, a low thermal conductivity, and a desirable mechanical strength, and which will typically resist failure, for example, cracking or rupturing due to the stresses which may occur during the pouring and cooling of a metal around the ceramic article. Furthermore, the ceramic body has the ability to absorb or relieve stresses (e.g., thermal relaxation) at temperatures of about 1300° C. and above which permits casting or incorporation within molten iron or alloys thereof. Moreover, the aforementioned ability to absorb or relieve stresses may result in an increase in the high temperature strength and toughness values relative to those observed at room temperature.

It should be understood that while a parent metal comprising aluminum is referred to primarily herein, aluminum is but one preferred parent metal which can be used in combination with the other features of the invention.

The aluminum titanate, which is present in the final ceramic body, may be provided initially as an aluminum titanate or it may be formed by a reaction of an aluminum titanate precursor or precursors. For example, $Al_2O_3$, $TiO_2$, aluminum metal and/or titanium metal when mixed and heated in an oxidizing environment may function as suitable precursors for forming the $Al_2TiO_5$ phase in the formed ceramic body. Note that the aluminum metal powder can react to form aluminum titanate (e.g., $2\ Al + 3/2O_2 + TiO_2\ Al_2TiO_5$). Thus, Al can be both a parent metal and an $Al_2TiO_5$ precursor. Accordingly, various mixtures of $Al_2TiO_5$, $Al_2O_3$, $TiO_2$, ilmenite, aluminum, and titanium metal powder etc., can be utilized to form the $Al_2TiO_5$ phase. These materials may not react fully and may also be present in the formed ceramic body as $Al_2O_3$, $TiO_2$, and/or unreacted metal, etc.

The amount of aluminum which is supplied to the starting composition which is utilized to form a ceramic body according to the present invention, can be varied depending upon the particular properties which are desired in the resultant ceramic body. For example, aluminum may be provided as a powdered metal, and can be present in an amount from about 5 weight percent to about 35 weight percent in order to provide a final aluminum titanate body having a desirable level of porosity. When a lower weight percentage of powdered parent metal (e.g., about 5 weight percent aluminum) is provided, a lesser amount of porosity can be present in the produced body (e.g., about 5 volume percent porosity). Moreover, when a greater weight percentage of parent metal (e.g., 20 weight percent) is provided to the initial starting composition, the amount of porosity which results in the formed ceramic body may be increased (e.g., about 50 volume percent). Accordingly, by controlling the amount of aluminum provided in the initial mixture (e.g., mixed in the initial mixture or in the green body) the amount and size of the porosity and the properties related thereto (e.g., thermal conductivity and thermal expansion) may be tailored or controlled in the final body.

Moreover, the composition of the powdered aluminum metal may also be important. Specifically, as discussed in the Commonly Owned Ceramic Matrix Patent Applications, in some cases it may be desirable to contact, at least at some point during the process, the powdered parent metal with at least one dopant. However, it may not be essential for such dopants to be combined with the parent metal (e.g., aluminum) in that the porosity which is formed due to the oxidation reaction of the aluminum metal with an oxidant, could be sufficient to provide desirable results in the formed ceramic body without the presence of any significant amount of dopants. The dopant may be alloyed into the parent metal initially or be provided separate from the parent metal (e.g., added as a separate powered component in the materials utilized to form the aluminum titanate body). Further, dopants may be provided as an impurity or constituent present in one or more of the components utilized to form the aluminum titanate phase (e.g., ilmenite).

The parent metal (e.g., aluminum and/or aluminum alloy) that is added to the aluminum titanate mixture, when heated, can be oxidized to provide porosity in the resulting aluminum titanate body and/or react with other constituents in the aluminum titanate mixture to form aluminum titanate. Further, the oxidation reaction product that is formed (e.g., the formation of an alumina oxidation reaction product) may compensate for and/or reduce the amount of shrinkage that the mixture would normally exhibit during sintering. Such compensation facilitates the formation of accurate net or near net shapes which may have an overall zero percent shrinkage. Particularly, at the temperatures utilized to heat the aluminum titanate mixture to form the aluminum titanate body (e.g., about 1400°–1600° C.) the aluminum alloy is reactive with an oxidant to form an oxidation reaction product. The result of the oxidation reaction is that porosity forms at points which correspond to those points where an aluminum particle was initially present. Accordingly, the aluminum particles used to form an oxidation reaction product of aluminum (e.g., $Al_2O_3$) should, typically, be present in a powdered form in a size which will facilitate the formation of porosity corresponding to this range of sizes (e.g., about 10 microns to about 50 microns). Although smaller aluminum particles may be utilized, these smaller particles could result in an explosion. It should be noted that parent metals other than aluminum can be utilized with the present invention. Metals such as tin, titanium, etc, which will oxidize in a suitable manner, for example, as described in aforementioned Commonly Owned U.S. Pat. No. 4,713,360 issued Dec. 15, 1987, to Newkirk et al. and which do not adversely impact the formation of aluminum titanate in the formed ceramic body, may be combined with the stabilization aid and aluminum titanate (or precursors to aluminum titanate), Moreover, the distribution of the powdered parent metal (e.g., aluminum) in the aluminum titanate mixture and/or the oxidant utilized can be controlled to provide a body comprising aluminum titanate which may have varying properties, for example, a graded microstructure. For example, the amount of porosity could be controlled from one side of a body to another (e.g., tailored throughout a cross-section of the body).

Stabilization aids assist in maintaining the morphology and crystallographic phases of the ceramic body. Specifically, stabilization aids, when present in the starting material mixture in an amount of from about 5 to about 20% by weight, including materials such as chrome ore, $Fe_2O_3$, $SiO_2$, $MgO$, and ilmenite ($FeTiO_3$), etc., may assist in maintaining the desired aluminum titanate phase and/or prevent the aluminum titanate phase from decomposing. Typically, ilmenite comprises FeO. $TiO_2$ or $FeTiO_3$ with small amounts of MgO, $SiO_2$, $Al_2O_3$, $NbO_5$, and/or $VO_5$ also being present. Chrome ore typically contains chromite which comprises iron oxide and chromic oxides. For example, if a body comprising $Al_2TiO_5$ is exposed to repeated heating and cooling cycles (e.g., 900°–1200° C.), the $Al_2TiO_5$ may decompose to form $Al_2O_3$ and $TiO_2$. Such decomposition could adversely impact the mechanical properties, and thus the performance of the ceramic body. As a further example, a body comprising $Al_2TiO_5$ may be exposed to a continuous temperature from about 400°–1450° C. Such exposure also may result in a decomposition of the $Al_2TiO_5$. Accordingly, it is advantageous to include stabilization aids in order to maintain a desirable $Al_2TiO_5$ phase and to ensure consistency of the physical properties of the ceramic body.

The percentages of the components, for example, precursors, utilized to provide the aluminum titanate phase in the body may vary. For example, the amount of aluminum titanate which results after reaction of the aluminum titanate precursors and/or sintering can vary from, preferably, at least about 50% by weight to as high as about 95% by weight. The limits on the amount of a particular material present are dictated by practical considerations such as the technique utilized to form the green body, characteristics desired in the final product, cost, etc. Further, a powdered parent metal of aluminum may operate in more than a single manner. Specifically, the aluminum may be provided to oxidize in situ to provide porosity in the final body and may be utilized as a precursor material for the formation of aluminum titanate. For example, aluminum and titanium metal may be utilized in the present invention. Specifically, when these metals are heated in an oxidizing environment to a temperature of about their respective melting points, an oxidation reaction product will be formed. The oxidation reaction products (i.e., $Al_2O_3$ and $TiO_2$) can react to form $Al_2TiO_5$. When additional heat is supplied and stabilization aids are present, a stabilized and sintered $Al_2TiO_5$ body may be formed. Moreover, aluminum may react with a stabilization aid to form a complex oxide. Depending on the nature of the complex oxide that is formed, such oxide may enhance or detract from the physical/mechanical properties of the formed aluminum titanate body.

The two following compositions are suitable to provide a green ceramic body which can be fired subsequently in accordance with Example 2 below. These compositions should be considered to be illustrative only and should not be construed as limiting the scope of the invention.

Composition 1

Approximately 78% by weight of a powder containing aluminum titanate and precursors to aluminum titanate, specifically, comprising about 32% by weight $Al_2TiO_5$ with the remainder being unreacted $Al_2O_3$ (about 37% by weight) and $TiO_2$ (about 31% by weight) The powder containing aluminum titanate had a particle size of about minus 200 mesh and was supplied by Mason Color and Chemical Works Inc., East Liverpool, Ohio and included trace amounts of $SiO_2$, MgO, and $Fe_2O_3$. The powder containing aluminum titanate was mixed with about 10% by weight $Fe_2O_3$ powder and about 12% by weight aluminum alloy powder. The aluminum alloy powder was also minus 200 mesh and it had the composition discussed in Example 1 below. The $Fe_2O_3$ powder was minus 325 mesh and was supplied by Fischer Scientific Company. After dry pressing, followed by oxidizing and sintering at a temperature of about 1500° C., the body contained about 91 wt % aluminum titanate as determined by quantitative x-ray diffraction analysis.

Composition 2

About 69% by weight of the powder containing aluminum titanate and precursors thereto (discussed above in Composition 1) was mixed with about 8% by weight of an aluminum alloy powder discussed in Example 1 below, and about 17% by weight chrome ore. To this mixture about 6% by weight titanium metal powder was added. The titanium metal powder was of minus 200 mesh particle size and was supplied by Atlantic Equipment Engineering, Bergenfield, N.J. The chrome ore was obtained from Foote Minerals of Exton, Pa., and had a particle size of minus 200 mesh. After dry pressing, followed by oxidizing and sintering at about 1500° C., the body contained about 78 wt % $Al_2TiO_5$ as determined by quantitative x-ray diffraction analysis.

Moreover, other conventional processing techniques in addition to dry pressing, such as slip casting, sediment casting, extrusion, injection molding, etc., can be utilized to form the green ceramic article. The particular substances utilized as binders or to form the slip include conventional materials such as polyvinyl alcohol, methyl cellulose, deionized water, tertiary amide polymer, polyelectrolyte dispersants, etc. The particle size of the powders and the amount of binder utilized may vary. However, it is preferred that the powdered components be on the order of about minus 200 mesh. After the green ceramic body is formed, the green body is dried, oxidized, and, preferably sintered to provide a body comprising aluminum titanate.

If desired, a molten metal can be cast around the article (e.g., aluminum titanate). Specifically, a compliant layer such as disclosed in aforementioned Ser. No. 116,412 (now U.S. Pat. No. 4,849,266) may be utilized to reduce damage to the ceramic body while casting. More importantly, one particular advantage of the present invention is that the aluminum titanate body of the present invention is resistant to thermal shock and molten metal (e.g., iron or aluminum) may be cast directly around the ceramic body without utilizing a coating or compliant layer to form, for example, an exhaust port liner within a cylinder head for an internal combustion engine.

Accordingly, without the need for a coating or compliant layer, the articles produced by present invention are more readily utilized in an engine design (e.g., a cylinder head for an internal combustion engine) having close dimensional tolerances or constraints.

In addition, it may be desired to increase the porosity formed by the oxidation reaction of the parent metal by including fugitive materials into the materials utilized to produce the green body. The fugitive materials include polystyrene pellets, sawdust, corn starch, coconut charcoal, etc. These materials will volatilize or burn off when heated in accordance with the present invention.

Without intending to be bound by any specific theory or explanation, the following is believed to explain why the aluminum titanate body formed according to the invention is: (1) resistant to thermal shock; (2) does not cause the casting metal to fail or yield; and (3) can be produced to a net or near net shape and may have a zero or near zero shrinkage when heated.

When a powdered parent metal (e.g., aluminum) is mixed with the aluminum titanate mixture and such is heated to a temperature of about 1400°–1600° C. in an environment containing an oxidant (e.g., air), the powdered parent metal at least partially oxidizes (e.g., aluminum is converted to alumina). This oxidation reaction results in an oxidation reaction product (e.g., $Al_2O_3$) which leaves behind a void or cavity which is at least partially lined by the resultant phase comprising $Al_2O_3$. Further, the oxidation reaction product may continue to grow beyond the original location of the metal particle to result in a reinforced or interconnected aluminum titanate phase(s) (e.g., the oxidation reaction product may be at least partially interconnected, which may result in the oxidation reaction product bonding or holding together at least portions of the aluminum titanate body). The cumulative effect of the oxidation of the aluminum alloy powder throughout the aluminum titanate body is the production of a desirable reinforced porosity. It is believed that the reinforced porosity desirably influences the thermal shock and casting-in properties of the aluminum titanate body produced according to the invention. Specifically, the porosity renders the aluminum titanate body resistant to thermal shock and compliant such that the body can withstand the rigors of a casting-in operation. Moreover, the presence of microcracks in the aluminum titanate body may also favorably influence the thermal shock and casting-in properties. Still further, the oxidation reaction process (e.g., conversion of parent metal to an oxide of the parent metal) is accompanied by an expansion of the body which may counteract or balance any sintering shrinkage. This phenomenon permits the production of a net or near net shape component with a near zero percent overall shrinkage. Such net or near net shape capabilities are significant in that an aluminum titanate mixture can be shaped into a desirable green body and heated and the resultant aluminum titanate body is substantially the same size and shape as the green body.

It has also been observed that during oxidation and sintering at temperature of about 1300°–1600° C., the formation of complex oxides containing aluminum can occur. Thus, the $Al_2O_3$ phase formed by the oxidation reaction process may react with excess $TiO_2$ and/or the stabilization aids such as chrome ore, Ilmenite or $Fe_2O_3$, etc., to form a stabilized aluminum titanate solid solution and/or complex oxidizes such as $Al_2O_3$—$Cr_2O_3$, Fe, Mg spinels, etc., which may also be present in solid solutions. Such complex oxides may also impart desirable mechanical properties to a formed aluminum titanate body.

In order to understand better the manner in which the present invention may be conducted, the following examples of the present invention are provided. These examples are intended to be illustrative only of various aspects of the manufacture of aluminum titanate bodies. Particularly, these examples should not be construed as limiting the scope of the invention.

Examples 1 and 2 demonstrate techniques which may be utilized to form a body comprising aluminum titanate.

EXAMPLE 1

An aluminum titanate body of the invention was prepared by slip casting a batch comprising aluminum titanate, chrome ore, $Fe_2O_3$, and a powdered aluminum alloy. The powder containing aluminum titanate was minus 200 mesh and supplied by Mason Color and Chemical Works Inc., East Liverpool, Ohio and as discussed above in Composition 1 comprised about 32% by weight $Al_2TiO_5$ with the remainder being unreacted $Al_2O_3$ and $TiO_2$, with trace amounts of $SiO_2$, MgO and $Fe_2O_3$ being present. The chrome ore was minus 200 mesh and supplied by Foote Minerals Company, Exton, Pa. The $Fe_2O_3$ was minus 325 mesh and was supplied by Fischer Scientific Company. A batch of slip was formed by mixing the powdered components with water and Darvan 7 dispersant and XUS 4030303 organic binder. The Darvan 7 dispersant was supplied by RT Vanderbuilt Company, Norwalk, Conn. The XUS 4030303 ceramic binder was supplied by Dow Chemical, USA, Midland, Mich. The ceramic powder portion of the slip was stirred and placed into a plastic jar containing an equal weight of alumina grinding media supplied by Fisher Chemical Company, King of Prussia, Pa. The liquid portion of the slip was added. This blend of slip filled about one-half to three-quarters of the volume of a 2 liter jar. The slip in the jar contained the following constituents (approximately):

| | |
|---|---|
| deionized water | 1475 g |
| Darvan 7 | 110 g |
| Acetic Acid (10% strength) | 25 g |
| XUS 403030 Binder (5% strength) | 81 g |
| Aluminium Titanate powder | 2965 g |
| Chrome Ore | 780 g |
| $Fe_2O_3$ | 225 g |

The slip was ball milled for about 18 hours. During the ball milling, the slip was adjusted with acetic acid to have a pH from about 6.9–7.3. After ball milling, about 531 grams of aluminum alloy powder was added.

The aluminum alloy was supplied by Belmont Metals and comprised about 2.5–3.5 weight % Zn, 3.0–4.0 wt % copper, 7.5–9.5 wt % Si, 0.8–1.5 wt % Fe, 0.2–0.3 wt % Mg, 0–0.5 wt % Mn, 0–0.001 wt % Be, and 0–0.35 wt % Sn.

The slip was again milled for about 1 hour during which the pH was again adjusted as necessary to be about 6.9–7.1. By controlling the pH, the reaction between aluminum and water was stabilized, thus reducing the formation of hydrogen gas. The specific gravity and viscosity of the slip utilized were about 2.1–2.2 and 250–750 centipose, respectively, which was achieved by controlling the amount of water and Darvan 7 dispersant.

The slip was cast into a plaster of paris mold, supplied by Holland Mold Company, Trenton, N.J., which inversely replicated the configuration of an exhaust port liner. The slip was poured into the mold and residual slip drained to give a wall thickness in the range of about 0.1–0.15 inch. After about 2 hours, the piece was removed from the mold and held in an electric resistance heated drying oven at a temperature of about 100° C. for approximately 18 hours. (Note that the piece may be dried within the mold by placing the whole assembly into the drying oven.)

After drying, the green ceramic article was oxidized and sintered in air utilizing an electric resistance type furnace supplied by Harrop Company, Columbus, Ohio. The following is the heating schedule which was utilized.

| Time, hrs | Temperature |
|---|---|
| 5 | room temperature to 105° C. |
| 10 | 105° C. |
| 5 | 105° C. to 350° C. |
| 5 | 350° C. |
| 5 | 350° C. to 450° C. |
| 5 | 450° C. |
| 17 | 450° C. to 1500° C. |
| 12 | 1500° C. |
| 10 | 1500° C. to 500° C. |
| 10 | 500° C. to room temperature |

A temperature of at least about 1500° C. is important to permit sufficient $Al_2TiO_5$ formation in the body. The aluminum titanate body produced according to this Example was suitable for casting in molten aluminum and/or iron, for example, in accordance with Example 3. Moreover, as discussed above, the pH was controlled to reduce the formation of hydrogen gas. However, this property may be utilized to provide a body which induces its own porosity due to the evolution of gas (e.g., self-foaming) that can be sintered subsequently.

Table 1 lists typical properties of an aluminum titanate body produced according to Example 1. In addition to the properties listed in Table 1, a body produced according to Example 1 also exhibits the properties set forth in Table 2.

TABLE 1

ENGINEERING PROPERTIES OF THE ALUMINUM TITANATE BODY OF EXAMPLE 1

| | | |
|---|---|---|
| Thermal Conductivity | 1.0 W/m-K | 0.6 Btu/(hr-ft-°F.) |
| Coefficient of Thermal Expansion | $1.5–2.0 \times 10^{-6}$/K (25–1000° C.) | $0.8–1.1 \times 10^{-6}$/°F. (77–1832° F.) |
| Strain to Failure | 1.2–1.3% | 1.2–1.3% |
| Compressive Strength | 320–350 MPa | 46.4–50.8 ksi |
| Flexural Strength | 20 MPa | 2.9 ksi |
| Young's Modulus | 14 GPa | $2.0 \times 10^6$ psi |
| Bulk Density | 2.6 g/cm$^3$ | 162 lb/ft$^3$ |

TABLE 2

ROOM TEMPERATURE AND ELEVATED TEMPERATURE MECHANICAL PROPERTIES FOR A BODY PRODUCED ACCORDING TO EXAMPLE 1

| Flexural Strength, MPa | | |
|---|---|---|
| Room Temperature | mean | 19.8 |
| | std dev | 3.4 |
| | sample size | 15 |
| 1000° C. | mean | 71.6 |
| | std dev | 13.1 |
| | sample size | 15 |
| Weibull Modulus | | |
| Room Temperature | | 5.2 |
| 1000° C. | | 5.3 |
| Strain at Failure, $10^{-4}$ | | |
| Room Temperature | mean | 115 |
| | std dev | 16 |
| | sample size | 15 |
| 1000° C. | mean | 398 |
| | std dev | 33 |
| | sample size | 15 |
| Toughness, MPa m 1/2 | | |
| Room Temperature | mean | 0.66 |
| | std dev | .07 |
| | sample size | 14 |
| 1000° C. | mean | 2.5 |
| | std dev | .6 |
| | sample size | 13 | std dev - standard deviation

EXAMPLE 2

An aluminum titanate body of the present invention was formed by dry pressing a disk measuring about 1.30 inches in diameter and about 0.40 inches in thickness. The powders pressed comprised about 71% by wt of a powder mixture containing about 32% by weight $Al_2TiO_5$ with the remainder being unreacted $Al_2O_3$ (about 37% by weight) and $TiO_2$ (about 31% by weight), with trace amounts of $SiO_2$, Mgo and $Fe_2O_3$ being present. About 17% by weight chrome ore, and 12% by weight aluminum alloy which were dry blended into the powder containing aluminum titanate. The powders were of the same size and supplier as discussed in Example 1. A 15% strength aqueous polyvinyl alcohol binder (Elvanol 75-15) supplied by E.I. Du Pont de Nemours and Company, Wilmington, Del., was added. This mixture was thoroughly blended until ready to be pressed. The mixture was pressed utilizing a dry press and a steel die. The pressure in the dry press was increased until lamination cracks began to appear in the dry pressed piece (e.g., about 5000–7500 psi).

The pressed pieces were placed upon a bedding of 38 Alundum, fused alumina, supplied by Norton Company, Worchester, Mass., for heating. The bodies were heated using the furnace and heating schedule of Example 1. The aluminum titanate bodies produced according to this Example were suitable for casting in molten aluminum and/or iron, for example, in accordance with Example 3.

FIG. 1 is an optical photomicrograph at 200 X of a cross-section of a body made according to this example. The darker regions (1) comprise the pores or cavities formed during the oxidation reaction and the lighter regions (2) comprise $Al_2TiO_5$. The gray regions (3) represent complex oxides. Note that at least a portion of region (3) contains microcracked areas designated (4).

Example 3 demonstrates a technique which can be utilized to cast or surround a body comprising aluminum titanate with a molten metal (e.g., aluminum).

EXAMPLE 3

Figure 2:
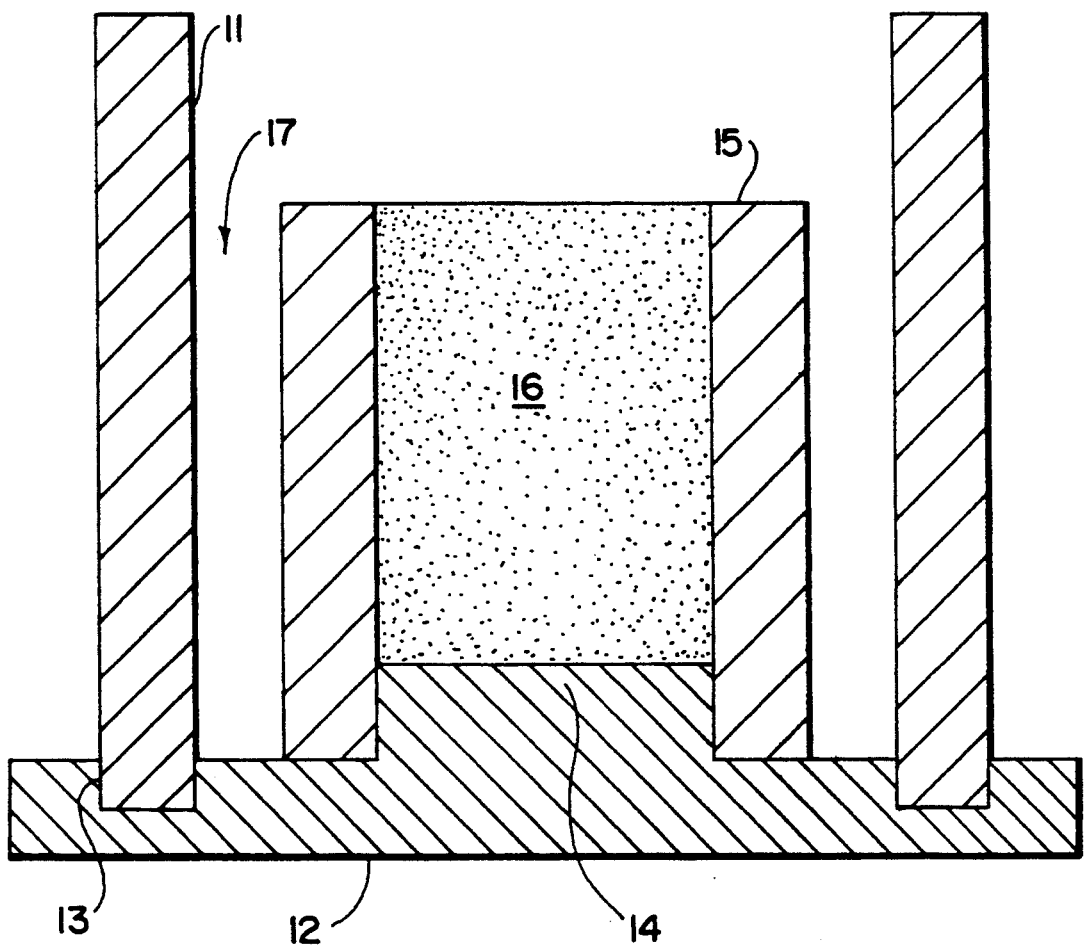
FIG. 2 is a schematic of an assembly which can be utilized to cast an aluminum titanate body in metal.

As shown in FIG. 2, an aluminum titanate tube (15) slip cast generally according to Example 1 was incorporated into aluminum by a casting-in operation. A graphite tube (11) measuring about 5.0 inches height having an outside diameter of about 3.4 inches and an inside diameter of 2.7 inches and a graphite plate (12) measuring about 6 inches in outside diameter and 1 inch in height and having a recessed circular region (13) and a raised circular centerpiece (14) for positioning an aluminum titanate tube (15), were utilized to cast molten aluminum around the tube (15). An aluminum titanate tube (15) measuring about 95 mm in length and having an outer diameter of about 44 mm was positioned on the raised portion (14) of the graphite plate. The tube (15) was filled with sand (16). The graphite plate (12) and tube (15) assembly were preheated to about 60° C. The aluminum alloy (not shown) used to surround the aluminum titanate tube (15) had a composition discussed above in Example 1. The aluminum alloy was heated to a temperature of about 750° C. The aluminum titanate tube (15) and graphite plate (12) were heated to within about 70° C. of the casting-in temperature (e.g., within about 70° C. of 750° C.). The temperature of the aluminum titanate tube (15) was monitored by a contact pyrometer. The graphite tube (11), preheated to 600° C., was placed around the tube (15) in the recess (13) on the graphite plate (12) in order to define a region (17) therebetween.

The molten aluminum alloy was poured quickly and continuously into the center of the graphite tube (11) and around the tube (15) into the region (17) until the tube (15) was encased completely. The entire assembly was permitted to cool slowly to room temperature by covering with a ceramic fiber blanket.

After the test assembly was cooled thoroughly to ambient temperature, the graphite tube (11) was removed and the sand (16) was removed from the ceramic tube (15). The tube (15) was inspected for any cracks, spalling, or shifting of the test piece which had occurred during testing. It was discovered that the aluminum titanate tube (15) did not crack either during the casting of the molten aluminum or during cool to room temperature.

Figure 3:
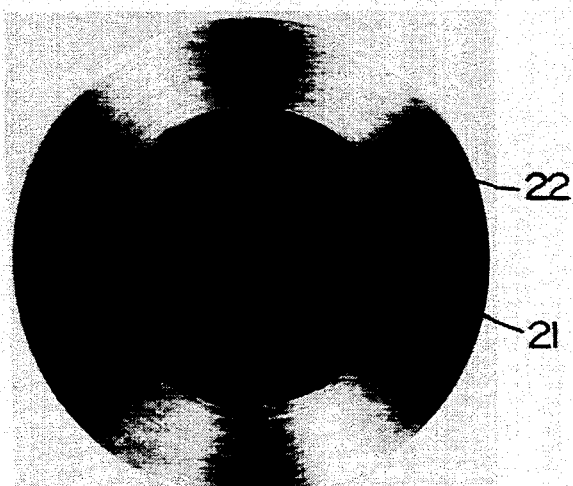
FIG. 3 is an actual photograph of aluminum titanate tube cast into aluminum.

FIG. 3 is an actual photograph of a sectioned exhaust port liner (i.e., a tube) cast into aluminum which was formed according to Example 3. Specifically, the aluminum titanate body (21) is surrounded by the aluminum casting metal (22). As shown in FIG. 3, the metal is integral with the sintered aluminum titanate body.

Figure 6:
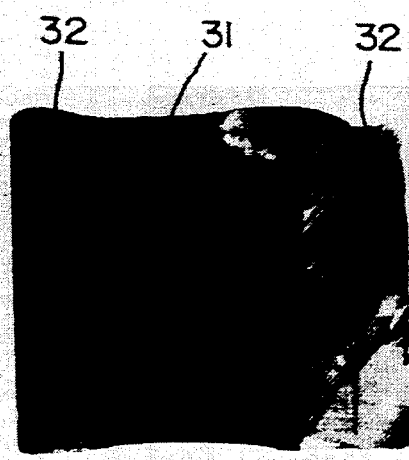
FIG. 6 is an actual photograph of a cross-section of an aluminum titanate tube surrounded by cast iron which was cast thereabout.

Moreover, by utilizing a process generally according to Example 3, it is possible to cast an aluminum titanate body, for example, formed generally according to Example 1 within molten iron. In this regard, FIG. 6 is an actual photograph of a cross-section of an aluminum titanate body produced according to Example 1 which has had molten cast iron cast and cooled thereabout.

Typically, when molten metal surrounding a ceramic article solidifies and begins to cool and contract, compressive stresses, for example, compressive shear stress can be induced in the ceramic article as a result of the difference in thermal expansion coefficient between the surrounding metal and the ceramic body. Accordingly, by virtue of the characteristics (i.e., mechanical and thermal conduction properties) of the aluminum titanate body of the invention, the aluminum titanate body can withstand the thermal shock and compressive stresses accompanying the molten metal casting procedures.

The mechanical properties of a plurality of aluminum titanate bodies produced according to the invention, and formed generally in accordance with Example 2 above, were determined. For purposes of comparison, a commercially available aluminum titanate body was obtained from Hoechst, Inc. The commercially available aluminum titanate body was a tube measuring about 6 inches in length and about 1¾ inches in outer diameter having about a ⅛ inch thick wall. The tube comprised about 100% by weight $Al_2TiO_5$. The test procedures utilized for determining average mechanical properties of each of the above mentioned 2 sets of materials were as follows:

Coefficient of Thermal Expansion. An Adamel-Lhomargy Dilatometer was utilized to determine the thermal expansion characteristics from room temperature up to about 1400° C. of a bar measuring about 1.5 to 2.0 inches long having an approximately 0.25 inch square end. The configuration of the end of the piece tested need not be square but can be, for example, circular.

Thermal Conductivity. These values were determined by calculating the product of thermal diffusivity, specific heat and bulk density.

The thermal diffusivity was determined by utilizing a pulse laser technique on a square plate machined to about 0.35 inches sq.×0.1 inches thick. The test involves heating the sample (i.e., plate) in a nitrogen filled chamber, illuminating one side with a laser beam and measuring the temperature rise on the opposite side with an infrared pyrometer. The units of the measurement are in $cm^2/s$. This procedure was repeated at sample temperatures from room temperature to about 1000° C. at 100° C. intervals to provide a relationship with temperature.

Specific Heat. The specific heat was determined on a machined 0.17 inch square×0.04 inch thick wafer utilizing a calorimeter. The sample was heated from room temperature to 600° C. at 100° C. intervals. The units are J/g/°C.

Bulk Density. The bulk density was determined by dividing the sample weight by the volume. The units are $g/cm^3$.

Mechanical Properties. The strength and compliance were determined in a uniaxial compressive mode. Rings and blocks cut from round disks (e.g., as formed in Example 2) were utilized for the compression tests. The rings were cut from sections of round tubes (e.g., exhaust port liners). The rings measured about 0.5 inches in height and about 1.7 inches in outside diameter. The blocks measured about 0.7 inch×1.0 inch×0.3 inch thick.

The rings and blocks were machined on the top and bottom to ensure parallel surfaces. The pieces were tested at room temperature with a Tinius Olsen mechanical tester instrumented with a Zygo laser sensor system to measure and plot sample deflections during the test. The samples were tested at a loading rate of 300 lb per min until fracture occurred.

The total strain was the strain measured at failure. The compliant strain as defined herein was determined from the stress/strain curve (i.e. as shown by the dashed lines in FIG. 4 discussed below in more detail) by extrapolating the upper-section of each line until it intersected the "X" axis of the graph. The compressive strength is the load at failure divided by the cross-sectional area of the sample. The Young's modulus is the slope of the upper linear section of the stress/strain curve.

Thermal Shock. The thermal shock test was conducted by immersing the aluminum titanate bodies into molten iron having a temperature of about 1400° C. and observing whether the body failed under the ensuring thermal excursion.

Table 3 lists the average values for the two sets of materials tested. Table 4 demonstrates the ability of the aluminum titanate material of the present invention, to at least partially compensate for shrinkage during sintering in order to provide a near-net shape article. The sintering shrinkage information is not available for the commercially available aluminum titanate body because it was obtained as a finished product from the manufacturer (i.e., Hoechst).

according to Example 2. Two individual test specimens (which correspond to two samples used to generate the data in Table 1) were utilized to generate the curves A and B in FIG. 4. Specifically, line A represents the stress/strain curve for a block of porous aluminum titanate composite produced according to Example 2; whereas line B represents the stress/strain curve for a ring of a commercially obtained Hoechst aluminum titanate body; whereas line C represents the stress/strain curve for a body produced substantially according to Example 1. For these bodies, the maximum compressive strength for line A (i.e., present Example 2) was 163 MPa, the maximum strain was $126 \times 10^{-4}$, and the compliant strain was 34. For line B (i.e., the commercial body), the maximum compressive strength was 288 MPa, the strain was $101 \times 10^{-4}$ and the maximum compliance strain was 28. For line C (i.e., present Example 1), the maximum compressive strength was 345 MPa, the maximum strain was $129 \times 10^{-4}$, and the maximum compliance strain was 45. For the casting-in operation, the critical mechanical property is the deformation capability of the material, as measured by the maximum strain and the compliance strain. Clearly the body produced by the method of Example 2 is markedly superior.

An important overall effect of the presence of the aluminum alloy is the ability to provide a porous aluminum titanate body, which may be microcracked in a preferred embodiment with improved thermal insulating properties compared to the relatively dense materials which are presently commercially available. While without intending to be bound by any specific theory, it is believed that the microcracking of the aluminum

TABLE 3

| Material | $CTE^1$ $10^{-6}$ | Thermal$^2$ Conductivity Watts/m °K | Total Strain $10^{-4}$ | Compliant Strain × $10^{-4}$ | Compressive Strength MPa | Young's Modulus GPa | Thermal Shock Failure |
|---|---|---|---|---|---|---|---|
| Example 2 | 1.9 | 1.0 | 128 | 30 | 171 | 20 | No |
| Commercial Aluminum Titanate | 0.5 | 2.0 | 117 | 26 | 291 | 32 | No |

$^1$CTE = Coefficient of Thermal Expansion from Room Temperature to 750° C.
$^2$Measured at 500° C.

TABLE 4

| | Diameter Change % | | Thickness Change % | | Density at 1500° C. |
|---|---|---|---|---|---|
| Material | 1400° C. | 1500° C. | 1400° C. | 1500° C. | (g/cm$^3$) |
| Example 2 | 0.3 | −6.9 | 3.8 | −5.2 | 2.60 |

Generally, the bodies produced according to Example 2 had lower densities and substantially similar or lower thermal conductivities than the commercially available aluminum titanate. The commercially available aluminum titanate typically exhibited higher compressive stresses. The commercially available aluminum titanate had a similar total strain capability and compliant strain capability. Although the commercially available aluminum titanate survived the thermal shock test, those bodies tested did not survive the incorporation (i.e., casting) by molten iron. Specifically, it appears that the stresses exerted on the commercial bodies were too large for the bodies to survive, whereas bodies produced according to the invention survived the same casting-in operation.

Figure 4:
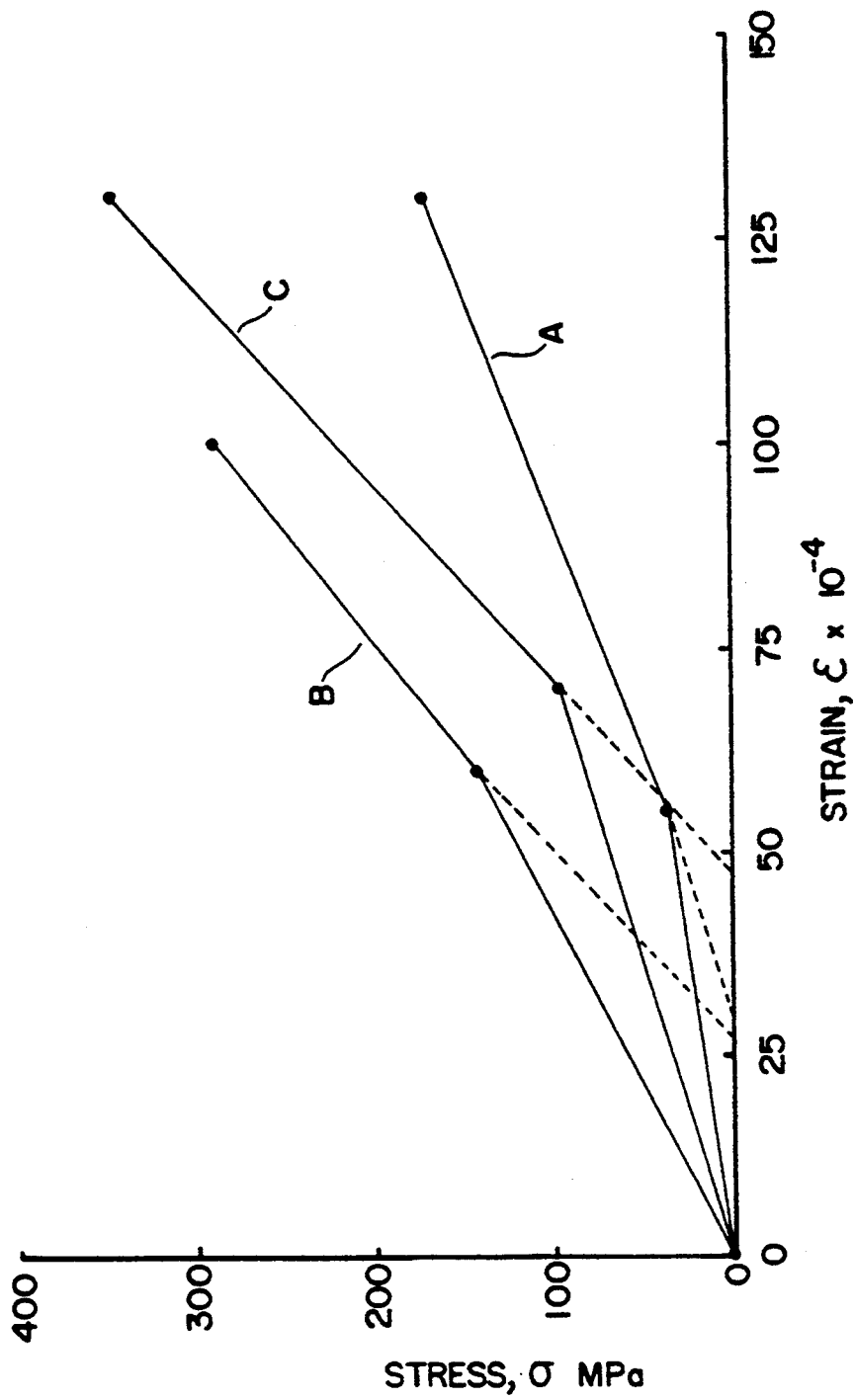
FIG. 4 is a graph of stress versus strain which compares two porous aluminum titanates bodies produced according to the present invention to a commercially available aluminum titanate body.

FIG. 4 represents the stress/strain curves for a commercially available aluminum titanate body obtained from Hoechst and an aluminum titanate body produced titanate may be the basis for the unusual properties displayed in FIG. 4. Specifically, as a force is applied to the aluminum titanate body, the microcracks may absorb such force by being pushed together (e.g., closed). Eventually, the microcracks may be substantially completely eliminated which causes a change in the mechanical properties of the body (i.e., the bend or break in the curves of FIG. 4). Accordingly, it is possible to tailor a body to provide the desired stress-strain characteristics for a predetermined force which will be exerted upon the body.

Figure 5:
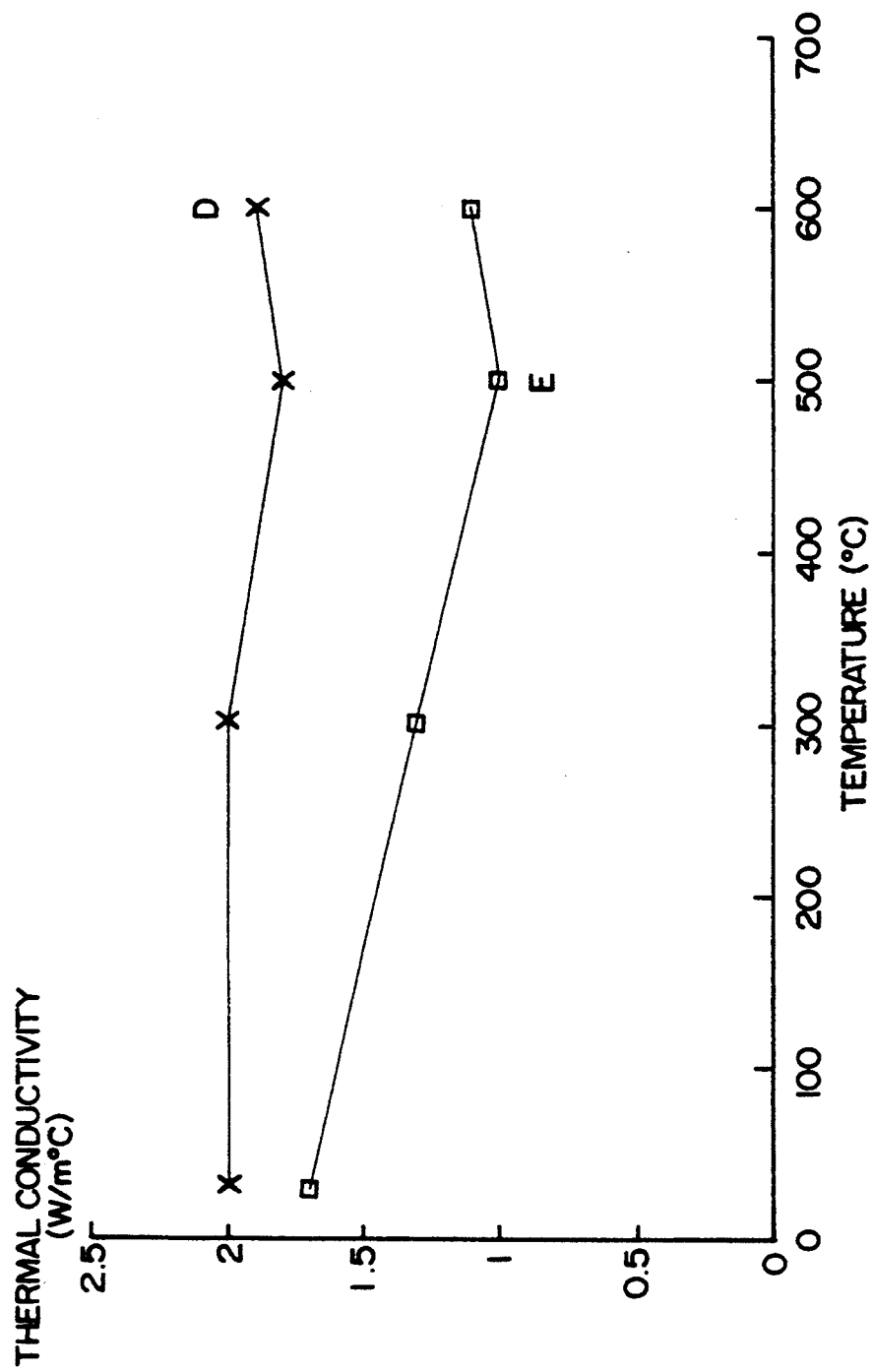
FIG. 5 is a temperature versus thermal conductivity graph comparing a porous aluminum titanate body produced according to the present invention to a commercially available aluminum titanate body.

Moreover, the material produced according to the invention exhibits enhanced thermal insulation properties (i.e., a reduced rate of thermal conduction) when compared to commercially available aluminum titanate bodies, as shown in FIG. 5. This reduced rate of thermal conduction permits enhanced heat conservation and accordingly, may thermally insulate bodies adjacent to the aluminum titanate body of the present invention from high temperature. Specifically, line D represents the thermal conductivity of the same tube of commercially available aluminum titanate utilized in FIG. 4. Whereas line E represents the thermal conductivity of the same piece of aluminum titanate of Example 2 utilized in FIG. 4. FIG. 5 demonstrates the general overall lower rate of thermal conduction for aluminum titanate bodies produced according to the present invention.

Moreover, the present invention contemplates a novel system of materials which are based upon Al, Ti, $Al_2O_3$, $TiO_2$, and $Al_2TiO_5$. For example, a mixture comprising Al or an Al alloy when mixed with $Al_2TiO_5$ and heated to about 1500° C. may form a final body comprising grains of the original $Al_2TiO_5$, or connected or bound together by a phase of porous $Al_2O_3$. The $Al_2O_3$ phase comprises an oxidation reaction product of the aluminum alloy. If thermal stability is desired, stabilization aids should be provided. Alternatively, some, or substantially all, of the aluminum initially provided, may ultimately form aluminum titanate or react to form a complex oxide. The amount of reaction may be controlled to any desired extent. For example, mixtures (e.g., aluminum titanate precursors) such as Al and $TiO_2$, or Ti and $Al_2O_3$ may react when heated in an oxidizing atmosphere to provide a body comprising $Al_2TiO_5$. The amount of reaction can be controlled by adjusting the temperature, oxidants, and/or amount of time for reaction, etc.

Moreover, the manner in which the parent metal oxidizes permits the formation of a final body of about the same dimensions as the green body (i.e., having an almost zero percent shrinkage). Specifically, as a body comprising an oxidizable metal reacts to form an oxidation reaction product, the body will tend to become porous and expand. As heating continues, the body may begin to sinter. The sintering may be accompanied by a shrinkage of the body. The overall effect can be that the body may shrink, due to sintering, in an amount substantially equal to the expansion which occurred in the body due to the formation of an oxidation reaction product, thereby resulting in a substantially zero net shrinkage between the green body and the final article. Further, a filler material, for example, SiC, may be added to the green body comprising aluminum titanate in order to control dimensional fluctuations which may occur during heating.

Still further, when a final body comprising aluminum titanate and a complex oxide of the stabilization aid is formed, the resultant body has improved thermal stability when compared to commercially available bodies (e.g., the ability of the $Al_2TiO_5$ phase to withstand repeated heating and cooling cycles without substantial decomposition). For example, a final body produced generally in accordance with Example 2 above, when heated to about 1100° C. and held at this temperature for about 100 hours retains about 75% by weight of the $Al_2TiO_5$ originally present. (Table 5 lists a comparison of the thermal stability of a body produced generally according to Example 2 and a commercially available $Al_2TiO_5$ body.) Whereas, the sample of commercial body tested, for example, obtained from Hoechst, when heated in the same manner comprised about 0% $Al_2TiO_5$. More importantly, the aluminum titanate bodies produced according to the present invention were still machinable and thermal shock resistant after the thermal stability testing whereas the commercial body was not. Particularly, the aluminum titanate bodies of the present invention can be machined by utilizing a conventional drill press and drill bit.

TABLE 5

THERMAL STABILITY:
% ALUMINUM TITANATE RETAINED

| | Example 2 | Commercial Aluminum Titanate |
|---|---|---|
| 900° C., 1000 hours | 80 | 63 |
| 1100° C., 100 hours | 75 | 0 |
| 1425° C., Cast into Cast Iron | 100 | 84 |

Accordingly, the present invention permits the formation of a porous, microcracked body comprising aluminum titanate which is more thermally stable and may be produced consistently at a net or near net predetermined configuration with almost zero percentage shrinkage.

While the present invention has been disclosed in the preferred embodiments, it is to be understood that the invention is not limited to the precise disclosure contained here but may otherwise be embodied with various changes, modifications and improvements which may occur to those skilled in the art without departing from the scope of the invention as defined in the appended claims.

What is claimed is:

1. A method for producing a self-supporting body comprising aluminum titanate, said method comprising:
   (a) providing a powder comprising a parent metal;
   (b) providing at least one dopant;
   (c) providing at least one material selected from the group consisting of aluminum titanate and aluminum titanate precursors;
   (d) providing at least one stabilization aid;
   (e) mixing the materials described in steps (a) through (d);
   (f) forming a green body from the mixture of step (e); and
   (g) heating said green body at a temperature sufficient and for a time sufficient to form said self-supporting body comprising aluminum titanate.

2. The method according to claim 1, wherein said heating comprises:
   (a) heating said parent metal to a temperature above its melting point but below the melting point of its oxidation reaction product to render said parent metal molten;
   (b) reacting said molten parent metal with an oxidant to form said oxidation reaction product;
   (c) maintaining at least a portion of said oxidation reaction product in contact with and between said molten parent metal and said oxidant, to progressively draw molten parent metal through said oxidation reaction product towards the oxidant so that fresh oxidation reaction product continues to form at an interface between said oxidant and previously formed oxidation reaction product, and concurrently forming porosity throughout said self-supporting body at points which correspond to those points where a parent metal particle was initially present; and
   (d) continuing said reacting for a time sufficient to form a desired amount of oxidation reaction product.

3. The method according to claim 2, wherein said oxidant comprises an oxygen-containing gas.

4. A self-supporting body comprising aluminum titanate and at least one metal selected from the group consisting of aluminum, titanium and alloys thereof.

5. The self-supporting body of claim 4, wherein said aluminum titanate is interconnected.

6. The self-supporting body of claim 4, further comprising an at least partially interconnected oxidation reaction product which bonds said aluminum titanate.

7. The self-supporting body of claim 6, wherein said oxidation reaction product comprises alumina.

8. The self-supporting body of claim 4, further comprising a complex oxide.

9. The self-supporting body of claim 8, wherein said complex oxide comprises alumina and at least one material selected from the group consisting of $Cr_2O_3$, magnesium spinels and iron spinels.

10. The self-supporting body of claim 4, wherein said aluminum titanate is stabilized with at least one material selected from the group consisting of $Cr_2O_3$, $Fe_2O_3$, $SiO_2$, MgO and $FeTiO_3$.

11. The self-supporting body of claim 4, further comprising at least one oxide selected from the group consisting of aluminum oxide and titanium dioxide.

12. The self-supporting body of claim 4, further comprising at least one filler material.

13. The self-supporting body of claim 4, further comprising from about 20 to about 50 percent porosity.

14. The method according to claim 2, wherein said oxidant comprises said at least one stabilization aid.

15. The method according to claim 2, wherein said oxidation reaction product comprises aluminum oxide.

16. The method according to claim 15, wherein said oxidation reaction product comprises a complex oxide containing aluminum.

17. The method according to claim 16, wherein said complex oxide comprises alumina and at least one material selected from the group consisting of $Cr_2O_3$, magnesium spinels and iron spinels.

18. The method according to claim 1, wherein said parent metal comprises aluminum, said at least one dopant comprises magnesium, said aluminum titanate precursors comprise aluminum oxide and titanium dioxide and said at least one stabilization aid comprises chromium (III) oxide and iron (III) oxide.

19. The method according to claim 1, wherein said stabilization aid comprises a material selected from the group consisting of $Cr_2O_{hd\ 3}$, $Fe_2O_3$, $SiO_2$, MgO and $FeTiO_3$.

20. The method of claim 1, further comprising adding at least one material to the mixture of step (e) comprising a material selected from the group consisting of a fugitive material and a filler material.

21. The method of claim 20, wherein said fugitive material comprises at least one material selected from the group consisting of polystyrene pellets, sawdust, cornstarch, coconut and charcoal.

22. The method according to claim 1, wherein said heating comprises at least one reaction of at least two aluminum titanate precursors to form at least a portion of said aluminum titanate of said self-supporting body.

23. The method according to claim 1, wherein said parent metal comprises an aluminum alloy containing at least one element selected from the group consisting of iron, silicon, copper, magnesium, manganese, chromium and zinc.

* * * * *